United States Patent
Ginart et al.

(10) Patent No.: US 10,205,407 B2
(45) Date of Patent: Feb. 12, 2019

(54) INVERTER DEVICE, ENERGY STORAGE SYSTEM AND METHOD OF CONTROLLING AN INVERTER DEVICE

(71) Applicant: sonnen GmbH, Wildpoldsried (DE)

(72) Inventors: Antonio Ginart, Marietta, GA (US); Hermann Schweizer, Hopfen am See (DE)

(73) Assignee: Sonnen GmbH, Wildpoldsried (DE)

( * ) Notice: Subject to any disclaimer, the term of this patent is extended or adjusted under 35 U.S.C. 154(b) by 0 days.

(21) Appl. No.: 14/855,509

(22) Filed: Sep. 16, 2015

(65) Prior Publication Data

US 2017/0077836 A1 Mar. 16, 2017

(51) Int. Cl.
| | |
|---|---|
| *H02M 7/487* | (2007.01) |
| *H02M 7/797* | (2006.01) |
| *H02M 1/00* | (2006.01) |
| *H02J 7/02* | (2016.01) |

(52) U.S. Cl.
CPC ............. *H02M 7/797* (2013.01); *H02J 7/022* (2013.01); *H02M 7/487* (2013.01)

(58) Field of Classification Search
CPC . H02M 7/487; H02M 7/797; H02M 2001/007
See application file for complete search history.

(56) References Cited

U.S. PATENT DOCUMENTS

| | | | | |
|---|---|---|---|---|
| 9,083,230 B2* | 7/2015 | Narimani | ................. | H02M 3/07 |
| 9,385,628 B2* | 7/2016 | Fu | ......................... | H02M 7/487 |
| 9,413,268 B2* | 8/2016 | Fu | ......................... | H02M 7/487 |
| 2010/0231173 A1* | 9/2010 | Andrea | .................... | H02J 7/022 |
| | | | | 320/137 |
| 2013/0057200 A1* | 3/2013 | Potts | ................. | H02M 3/33584 |
| | | | | 320/107 |
| 2013/0094260 A1* | 4/2013 | Martini | ................. | H02M 7/483 |
| | | | | 363/97 |
| 2014/0217827 A1* | 8/2014 | Cheek | ................. | H02M 7/5387 |
| | | | | 307/66 |
| 2015/0028794 A1* | 1/2015 | Flett | ...................... | H02M 7/537 |
| | | | | 320/101 |
| 2015/0155712 A1* | 6/2015 | Mondal | ................. | H02J 3/1857 |
| | | | | 307/23 |
| 2015/0256104 A1* | 9/2015 | Fu | ......................... | H02M 7/537 |
| | | | | 363/131 |

(Continued)

*Primary Examiner* — Timothy J Dole
*Assistant Examiner* — Sisay G Tiku
(74) *Attorney, Agent, or Firm* — Sughrue Mion, PLLC

(57) ABSTRACT

An inverter device, an energy storage system comprising such an inverter device, and a method of controlling such an inverter device are provided. The inverter device has a split-phase, transformer-less configuration and is connectable between a battery and a power grid for transferring power in a bidirectional manner between said battery and said power grid. The inverter device further comprises: an inverter circuit comprising switching elements arranged in a multilevel clamped topology; and a control unit controlling said switching elements, wherein said control unit is configured to control said switching elements such that direct current (DC) power from said battery is transformed into alternating current (AC) power and supplied to said power grid during a discharging period, and AC power from said power grid is transformed into DC power and supplied to said battery during a charging period.

16 Claims, 5 Drawing Sheets

(56) References Cited

U.S. PATENT DOCUMENTS

| | | | |
|---|---|---|---|
| 2015/0357935 A1* | 12/2015 | Ding | H03K 17/0828 |
| | | | 363/131 |
| 2015/0372615 A1* | 12/2015 | Ayyanar | H02M 1/15 |
| | | | 363/131 |
| 2015/0381074 A1* | 12/2015 | Flett | H02M 7/537 |
| | | | 320/101 |
| 2016/0043659 A1* | 2/2016 | Xu | H02M 7/537 |
| | | | 363/131 |
| 2016/0268924 A1* | 9/2016 | Fu | H02M 7/483 |
| 2017/0229978 A1* | 8/2017 | Ayai | H02M 7/539 |

* cited by examiner

INVERTER DEVICE, ENERGY STORAGE SYSTEM AND METHOD OF CONTROLLING AN INVERTER DEVICE

FIELD OF THE INVENTION

The invention relates to an inverter device, an energy storage system comprising such an inverter device, and a method of controlling such an inverter device.

BACKGROUND OF THE INVENTION

As local energy sources, in particular alternative energy sources such as solar panels and wind turbines, are becoming more widespread in Europe, in the US, and in the rest of the world, the demand for effective and inexpensive technologies for connecting these local energy sources to already existing electrical networks is increasing as well. Many local energy sources, such as solar modules, and also the electrical energy storage devices provide, and in the latter case require, direct current (DC) power. On the other hand, electrical networks, in particular the external electrical grid maintained and administered by an external power provider, work with alternative current (AC) power. In order to convert between DC power and AC power, use is made of power inverters, in the following also just called inverters.

In addition to converting between DC and AC power, modern inverters fulfill a range of other functions. They are able to automatically adjust the output voltage and synchronize with the electrical grid. It is furthermore possible to program them for controlled input and output depending on various electrical and environmental parameters detected through appropriate sensors. Most inverters have to utilize a transformer in one form or the other for creating the appropriate output voltage. This applies especially in cases where a specific inverter technology developed for the European market, where power grids are generally based on the three-phase electric power standard, is modified and adapted for the US market, where power grids are generally based on a split-phase electric power standard. The modification to the inverter then involves utilizing a transformer for converting the three-phase grid connection of the inverter to split-phase standard.

However, the use of transformers makes power inverters heavy and expensive. Transformers can also be an additional source of loss, which can lower the efficiency of an inverter. An example for a transformer-less, unidirectional power inverter is disclosed in US 2011/0299312 A1. This known inverter is a 3-level neutral point clamped (NPC) inverter designed for connecting a solar cell array to a power grid. The DC output of the solar cell array is converted to an AC voltage using pulse width modulation.

It is an objective of the present invention to provide devices and methods for converting between DC power and AC power, which are diversely and flexibly applicable, in particular for use with batteries. They should further be cost effective and have low electrical loss.

SUMMARY OF THE INVENTION

In order to achieve the above-mentioned objective, according to one aspect of the invention, an inverter device is provided. The inverter device can be electrically connected between a battery and a power grid, thus leading to an energy storage system according to a further aspect of the invention.

The inverter device comprises an inverter circuit, which has switching elements arranged in a multilevel clamped topology. These switching elements are controlled by a control unit, which is also part of the inverter device. The control unit is configured to control said switching elements such that during a discharging period, DC power from said battery is transformed into AC power and supplied to said power grid. Furthermore, the configuration of the control circuit is such that during a charging period, AC power from said power grid is transformed into DC power and supplied to said battery.

In order to accomplish this operation, according to a third aspect of the invention, a method of controlling an inverter device, which is electrically connected between a battery and a power grid and which comprises an inverter circuit having switching elements arranged in a multilevel clamped topology is provided. By performing said method, said switching elements are controlled such that, during a discharging period, DC power from said battery is transformed into AC power and supplied to said power grid, and, during a charging period, AC power from said power grid is transformed into DC power and supplied to said battery. In an advantageous embodiments said inverter device is configured to support both a battery and a solar module.

By allowing for both a charging and a discharging period, it is assured that the inverter device can function bi-directionally. In other words, it can convert between DC power and AC power in both directions, which is necessary for utilizing a battery as an electric storage device. The inverter can still also be utilized as a solar power inverter, giving it more flexibility and a broader range of application.

Said inverter device has a transformer-less design. This means in particular, that the DC side terminal of the inverter device is not galvanically isolated from its AC side terminal.

Said inverter circuit is configured as a split-phase inverter. In particular, the split-phase inverter may be configured to generate two phases, and said control unit may be configured to control said switching elements such that said two phases are separated by substantially 180°. A split-phase voltage output allows the use of the inverter for feeding AC power into power grids which are not utilizing three-phase systems, such as for example power grids in the US.

According to an advantageous embodiment, said switching elements of said inverter circuit are arranged in a neutral point clamped (NPC) topology or in a modified neutral point clamped (MNPC) topology. The MNPC topology is often also referred to as an NPC2 topology. The NPC and MNPC topologies are described in detail in "Partial 5/3 Level Topology for Solar Grid-tie Inverters", A. Ginart et al., published in Energy Conversion Congress and Exposition (ECCE), 2014 IEEE. September 2014, pages 5736-5742, the content of which is incorporated herein by reference in its entirety.

Said switching elements of said inverter circuit advantageously comprise solid state switches, such as transistors, in particular insulated-gate bipolar transistors (IGBTs). Said switching elements may be controlled, i.e. switched on and off, by the control unit independently or in groups. Each switching element is advantageously connected to a freewheeling or flyback diode and/or is diode clamped. In particular, the freewheeling diode may have a similar power rating as the switch it is connected to. In an advantageous embodiment, two or more switches are placed together in one die, i.e. they are packages together into a single electronic component, possibly together with their respective freewheeling or clamping diode. This has the advantage of reducing parasitic inductances.

The freewheeling or clamping diodes may be produced using a different technology or using different base materials than the switching elements, e.g. transistors, themselves. For example, the diodes may be made of silicon carbide, while the transistors are silicon-based.

According to an advantageous embodiment, said control unit comprises a pulse width modulation (PWM) control unit. Said PWM control unit produces PWM signals, which are used to control the switching elements. During the discharging period, the inverter circuit thus produces a multilevel output voltage, which after filtering is sinusoidal and can be fed as an AC power to the power grid.

According to an advantageous embodiment, said inverter device further comprises a direct current to direct current (DC-DC) bidirectional voltage converter connected to said inverter circuit and connectable to said battery, said bidirectional voltage converter comprising further switching elements controlled by said control unit. Said DC-DC converter can be designed and/or controlled by the control unit to function as a bidirectional voltage converter. In particular, said DC-DC converter can be designed and/or controlled by the control unit to operate as a boost or as a buck. The DC-DC converter can comprise one or multiple legs. In the latter case, it can have an interleaving configuration. In particular, a DC-DC converter comprising two legs may have a 180° interleaving configuration, a DC-DC converter comprising three legs may have a 120° interleaving configuration, and a DC-DC converter comprising four legs may have a 90° interleaving configuration.

Advantageously, the DC terminal of said inverter device, in particular the input terminal of said DC-DC voltage converter, which connects to said battery, comprises an inductance. The inductance is a (magnetic) energy conversion storage that allows energy transfer from and to the battery. Said inductance acts as a bidirectional regulator.

According to an advantageous embodiment, said inverter device comprises a DC-DC unidirectional voltage converter connected to said inverter circuit and connectable to a solar panel. Said DC-DC converter can be designed and/or controlled by the control unit to operate as a unidirectional voltage converter. By replacing the DC-DC bidirectional voltage converter of the embodiment described above with a DC-DC unidirectional voltage converter, the remainder of the inverter device may be utilized for supporting a battery and a solar panel at its DC terminal.

According to an advantageous embodiment, said control unit and said inverter circuit are arranged in a feedback loop. In particular, said switching elements may be controlled depending on one or more instantaneous values of the following electrical parameters: voltage at an input terminal of said inverter circuit, voltage at a point inside said inverter circuit, voltage at an output terminal of said inverter circuit, current at an input terminal of said inverter circuit, current at a point inside said inverter circuit, current at an output terminal of said inverter circuit. Two or more of said instantaneous values may be combined by mathematical operators in order to obtain operational results, which are used as input to a module of said control unit in order to produce a feedback control parameter to control said switching elements. Said instantaneous value may be detected using in particular current and voltage measuring means.

According to an advantageous embodiment, said control unit is a direct power control control unit. In particular, the control unit is a bidirectional direct power control pulse width modulation control unit. In particular, according to an advantageous embodiment, said control unit is configured to control said switching elements such that the current extracted from said battery during said discharging period or the current supplied to said battery during said charging period has a quadratic sinusoidal form.

The underlying theory behind the direct power control is that for a single phase system the power transferred between the DC terminal of the inverter device, which is connected to the battery, and the AC terminal of the inverter device, which is connected to the power grid, follows the quadratic shape of a sinusoidal wave. This is due to the nature of the sinusoidal form of the currents and voltages in the power grid. Thus, in order to minimize an accumulation of transitory energy during the charging and discharging period, the power extracted from or provided to the battery needs to follow the same natural patterns of the power grid. In three-phase balanced systems, this procedure is not required, because the transferred power is practically constant, requiring similar conditions from the battery storage system. In three-phase balanced systems, the control is usually based on a direct-quadrature-zero or d, q transformation which simplifies the control by taking advantage of this practically constant power.

According to a further advantageous embodiment of the method, a current having a quadratic sinusoidal form is delivered to said battery during said discharging period and/or a current having a quadratic sinusoidal form is extracted from said battery during said charging period.

The inverter device advantageously comprises one or more of the following functional blocks of circuits or circuit elements: A DC-DC voltage converter connectable or connected to the battery directly or through a filter, an inverter circuit, in particular a split-phase inverter circuit connectable or connected to the power grid directly or through a filter, a DC link linking said DC-DC voltage converter and said inverter circuit and comprising capacitive elements, and a bidirectional control controlling switching elements, which are built into said inverter circuit and into said DC-DC voltage converter.

It should be noted that the battery itself may comprise multiple individual batteries connected in series. Instead of a battery, one may therefore speak of an electric storage device, consisting of one or more batteries.

BRIEF DESCRIPTION OF THE DRAWINGS

The present invention will be explained in more detail in the following text with reference to preferred embodiments of an energy supply system according to the invention, which are illustrated in FIG. 1 through FIG. 4 and are not intended to be restrictive.

DETAILED DESCRIPTION

Elements and functional blocks having similar functions in the different embodiments are references with the same number, even though their setup and/or effect may wary across different embodiments.

Figure 1:
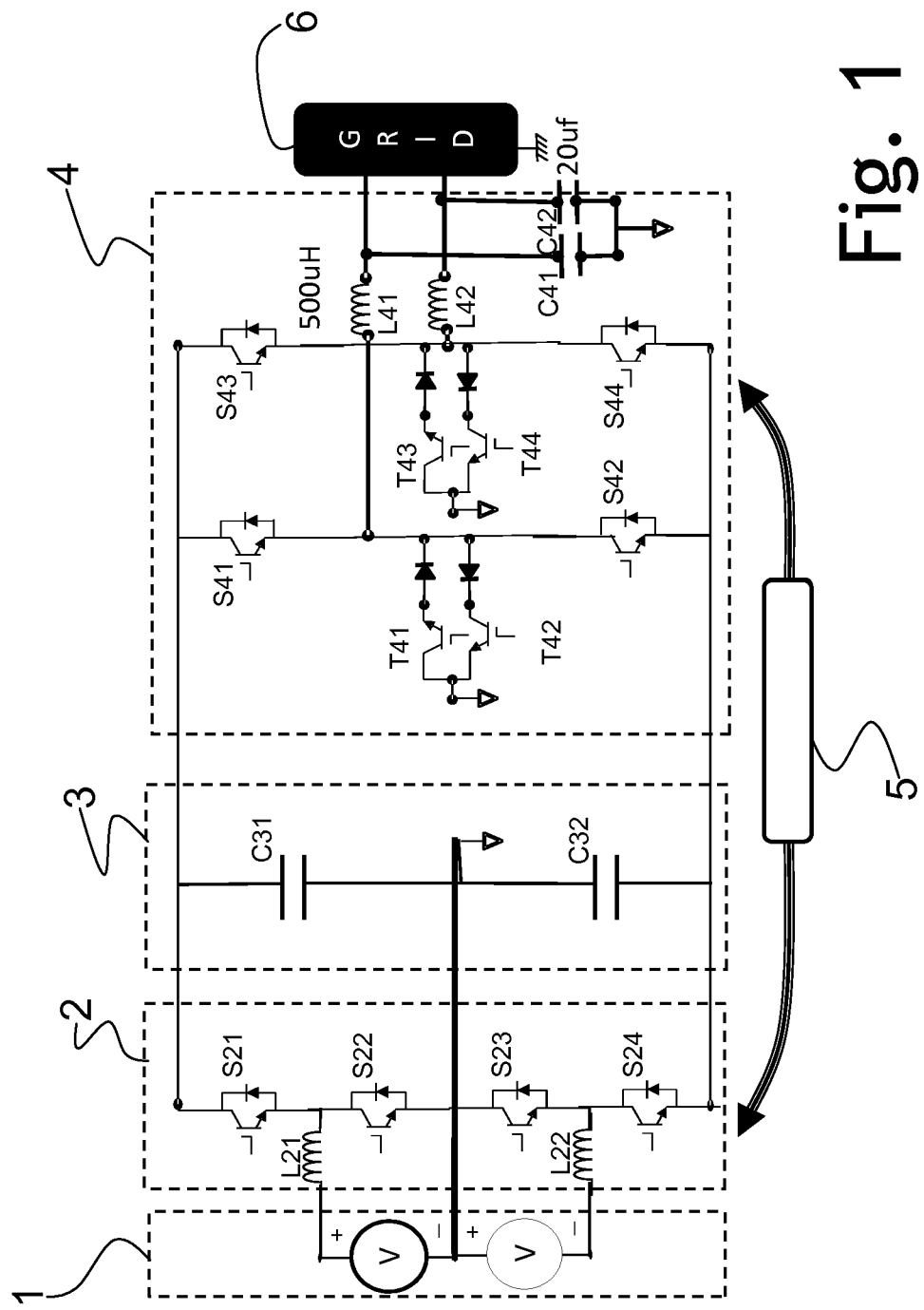
FIG. 1 is a circuit diagram of an inverter device according to a first embodiment of the invention.

FIG. 1 shows a circuit diagram of an inverter device according to a first embodiment of the invention. Said inverter device is connected on its DC terminal to an electric energy storage 1, which comprises two batteries 11, 12, and on its AC terminal to a power grid 6, in particular an external local, regional, or national electric power grid. Said inverter device is divided into functional blocks for ease of explanation. Each functional block is indicated by a dashed box. All or parts of the electronic elements of one, two or more of the functional blocks may be placed inside a common housing, on a common printed circuit board and/or on a common die or integrated circuit.

The first functional block, a DC-DC voltage converter 2, is connected directly to said energy storage 1. The connection from said energy storage 1 to said DC-DC voltage converter 2 leads over inductances L21, L22, the role of which will be explained further down in connection with FIGS. 4a and 4b. Said DC-DC voltage converter 2 comprises four switching elements S21, S22, S23, S24, each of which is a transistor, in particular an IGBT, connected to a freewheeling diode.

The second functional block, a DC link 3, is connected to the DC-DC voltage converter 2, opposite to the energy storage 1. It comprises a capacitor bank with two capacitors C31, C32 connected in series between the terminals of the DC-DC voltage converter 2. A common ground of the DC-DC voltage converter 2 and the energy storage 1 is connected also to the central connection point of the two capacitors C31, C32.

The third functional block is an inverter circuit 4, which is connected between the DC link 3 and the power grid 6. The inverter circuit 4 comprises a low pass filter, through which it is connected to the power grid 6. Here, the low pass filter is shown inside the dashed box indicating the inverter circuit 4. However, the low pass filter may alternatively be seen as a separate functional block of the inverter device, having a function distinct from the other functional blocks. The inverter circuit 4 has a split-phase configuration comprising two legs. One of the legs comprises the switching elements S41, S42, T41, T42 in an MNPC three-level inverter topology and leads into the low pass filter composed of the inductor L41 and the capacitor C41. The other of the legs comprises switching elements S43, S44, T43, T44 in an MNPC three-level inverter topology and leading into the low pass filter composed of the inductor L42 and the capacitor C42.

Each of the switching elements is a transistor, in particular an IGBT. Each of the switches S41, S42, S43, S44, which are responsible for providing the +V and the −V voltage levels, is connected to a corresponding freewheeling diode. In contrast, the switches T41, T42, T43, T44, which are responsible for the zero voltage level, are diode clamped.

Figure 2:
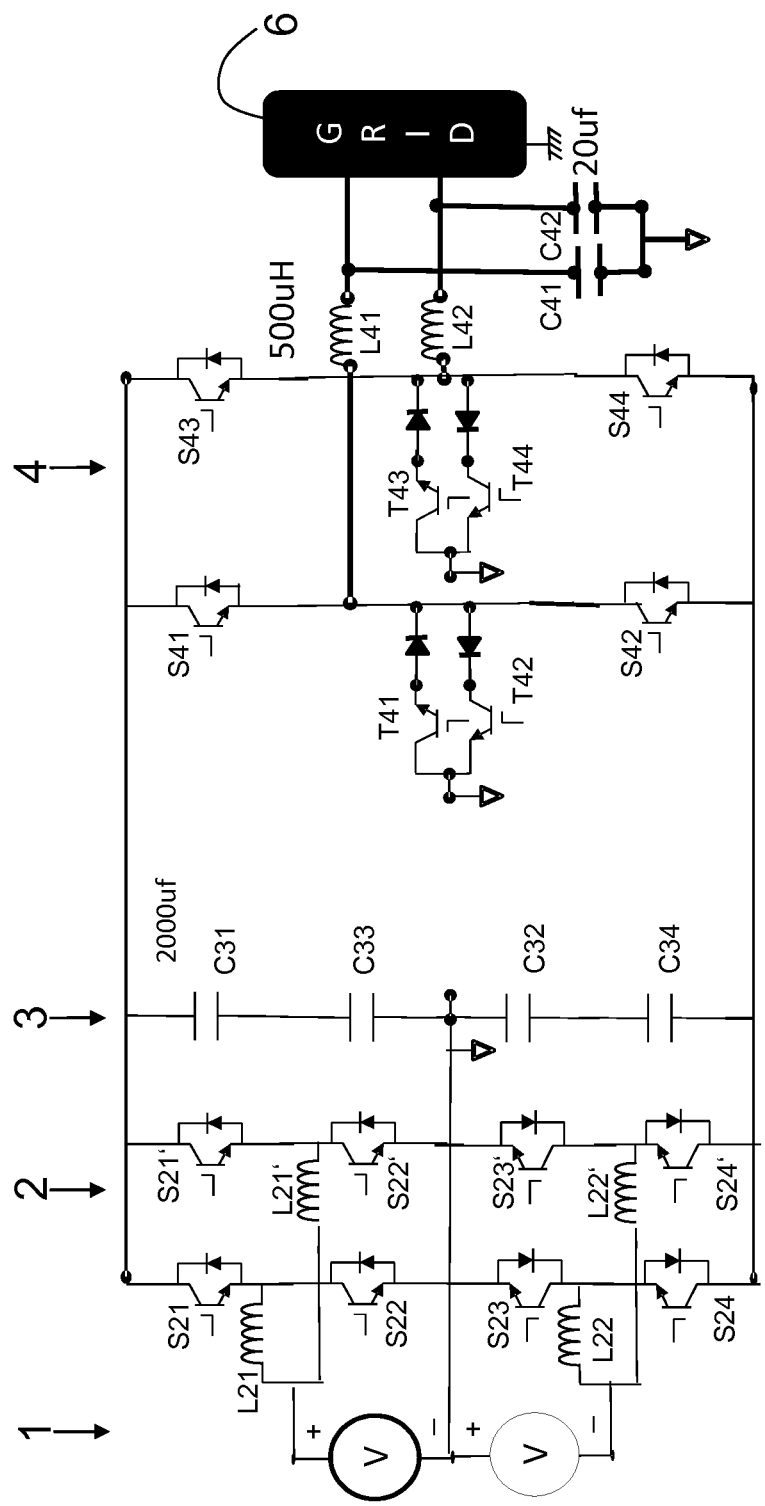
FIG. 2 is a circuit diagram of an inverter device according to a second embodiment of the invention.

A bidirectional control unit 5 is only shown schematically in FIG. 1. Two arrows emanating from said control unit 5 indicate its influence on the DC-DC voltage converter 2 and the inverter circuit 4 by controlling the corresponding switches S21, . . . , S44, T41, . . . , T44 by way of applying appropriate voltages to their respective gates. The electric connections between each of these gates and the control unit 5 are omitted for avoiding confusion. The box indicating the control unit 5 is omitted in the following FIG. 2 and FIG. 3. However, of course the control unit 5 is also present in those embodiments and has the same or similar functions as described herein.

Figure 3:
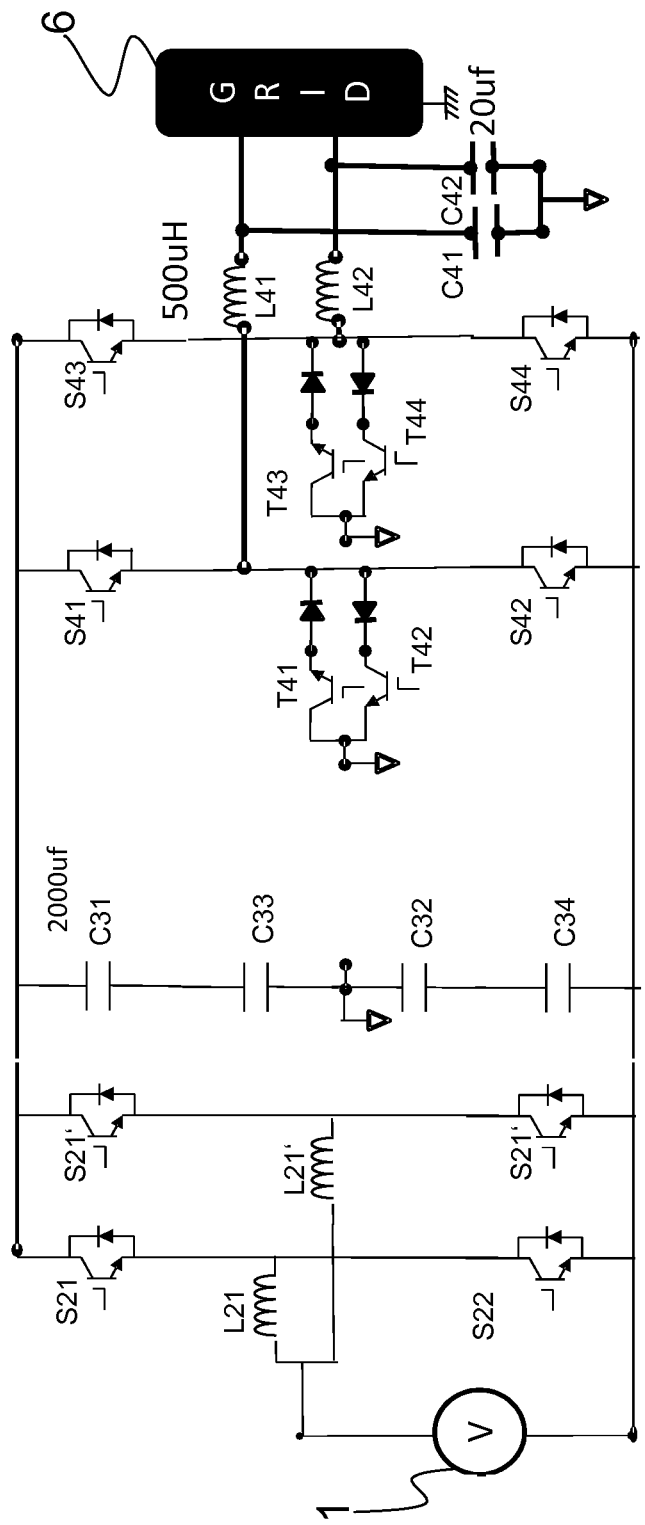
FIG. 3 is a circuit diagram of an inverter device according to a third embodiment of the invention.

The DC-DC voltage converter 2 of the inverter device shown in FIG. 1 has only one leg. An embodiment of an inverter device having a DC-DC voltage converter 2 with two legs in an interleaved configuration is shown in FIG. 3. Here, the switches S21, S22, S23, S24 and the inductances L21, L22 are mirrored in parallel by the switches S21', S22', S23', S24' and the inductances L21', L22'. The DC link 3 comprises the capacitors C31, C32, C33, C34. The inverter circuit 4 is configured similarly to the one shown in FIG. 1.

FIG. 3 shows yet another embodiment of said inverter device. The DC link 3 and the inverter circuit 4 are designed similar or identical to the ones shown in FIGS. 2 and 3. However, the DC-DC voltage converter 1 shows a different topology, which allows for grounding the battery. Such a possibility is very important for application of the inverter device in the US market. The DC-DC voltage converter shown in FIG. 3 still has a two-leg design, with the switches S21, S22 and the inductance L21 forming one leg, while the switches S21', S22' and the inductance L21' form the second leg in parallel to the first one. Instead of the battery, a photovoltaic module, i.e. a solar cell or a solar panel may be connected to the DC terminal of the inverter device shown in FIG. 3. In this case, the control unit has to control the switches S21, S22, S21', S22' in such a way as to form a DC-DC unidirectional voltage converter.

Figure 4A:
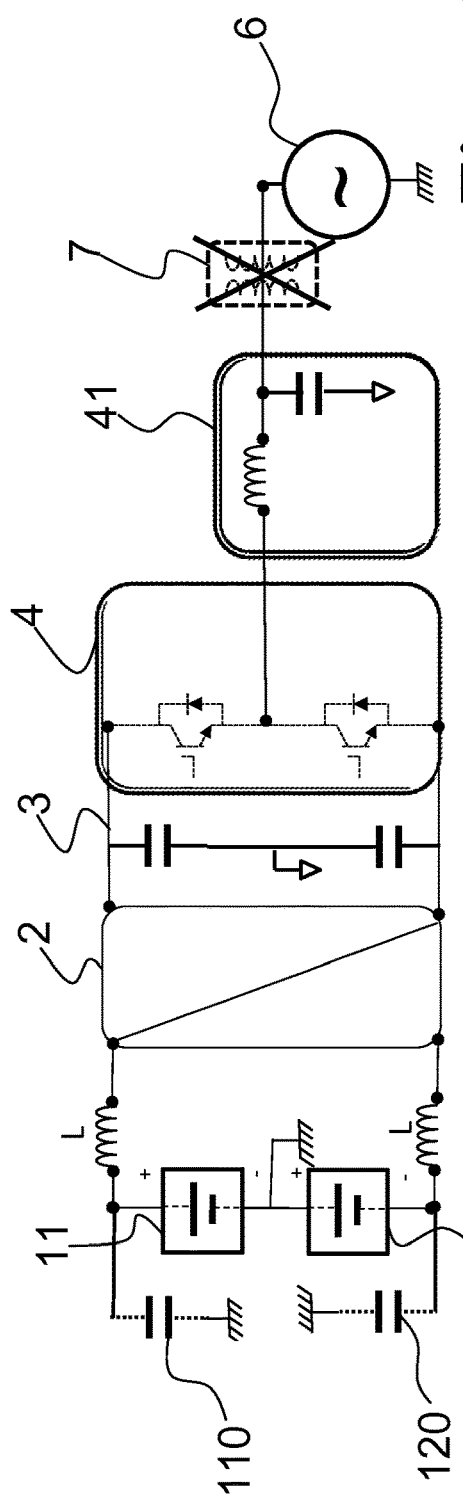
FIGS. 4a and 4b are schematic diagrams for explaining the effect of parasitic capacitances.

FIG. 4a shows a block diagram of the inverter device, showing schematically the different functional blocks it is made of, while omitting the control unit. It comprises two batteries 11, 12, which are connected through inductances L to a DC-DC voltage converter 2. The DC-DC voltage converter 2 is followed by a DC link 3 and an inverter circuit 4, which is connected to a low pass filter 41, here shown as a separate functional block. The low pass filter 41 is connected to the power grid 6.

Figure 4B:
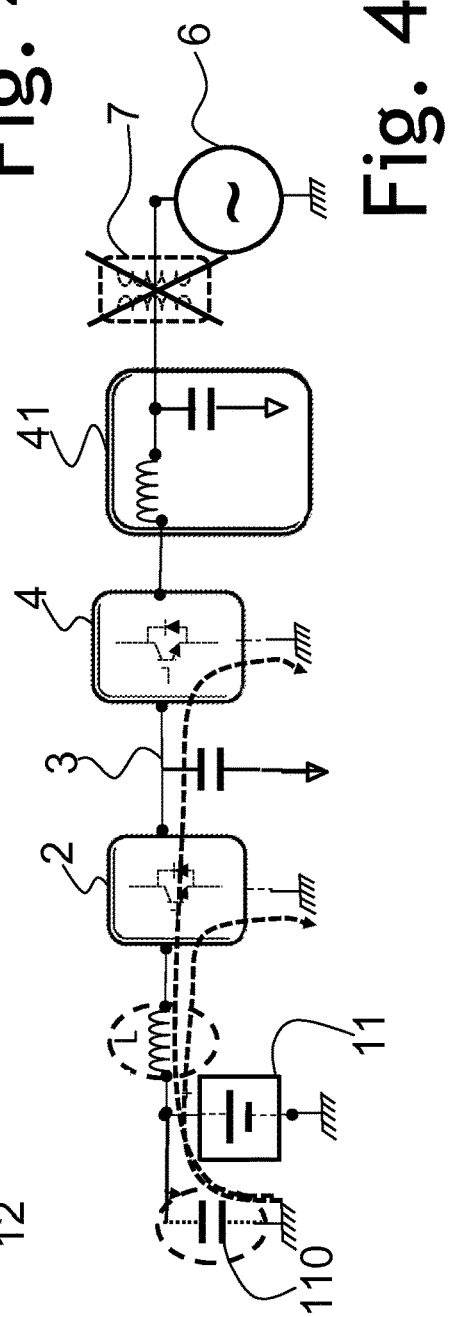

As indicated in FIGS. 4a and 4b by a crossed-out transformer icon 7, the inverter device is configured transformer-less. In order to produce an efficient inverter device in transformer-less technology, the topology used must guarantee very low ground leakage currents, which mostly stem from parasitic capacitances in the system. Parasitic capacitances 110, 120 between the batteries and ground are indicated in FIG. 4a as well. FIG. 4b shows an equivalent circuit of the inverter device of FIG. 4a, which is cut into half at a symmetry ground line. In FIG. 4b, possible leakage currents from the battery 11 through the DC-DC converter 2 to ground and through the inverter circuit 4 to ground due to said parasitic capacitance 110 are limited thanks to the inductor or inductance L and to the modified NPC (MNPC) topology. Any additional current leakage to the grid ground is also limited. The inductance L acts as a bidirectional regulator. It highly restrains any discharge from the parasitic capacitances 110, 120 present between the batteries and ground.

As mentioned above, the underlying theory behind the direct power control is that the power transferred between the DC terminal and the AC terminal of the inverter device follows the shape of a quadratic sinusoidal wave, i.e. sinus squared. In the following, the power relation between a battery system and a single phase AC system are described mathematically.

The DC current can be computed based on energy conservation as follows:

$$P_{DC}=I_{DC}*V_{DC}=\eta I_{RMS}*V_{RMS}=P_{AC}$$

Here, $P_{DC}$, $I_{DC}$, and $V_{DC}$ are the power, current and voltage on the DC side, i.e. of the battery, while $I_{RMS}$ and $V_{RMS}$ are the desired root mean square values of the current and the voltage, and $P_{DC}$ is the power on the DC side, i.e. on the power grid.

Assuming that the efficiency and power factor equal to one, the instantaneous, i.e. time dependent, values of the current and voltages can be computed as follows:

$$V_{DC}I_{DC} = V_{RMS}\sqrt{2}\sin(\omega t)I_{RMS}\sqrt{2}\sin(\omega t) = 2V_{RMS}I_{RMS}\sin^2(\omega t)$$

Here, $\omega$ is the frequency of the DC current and voltage and t is the time. As a result, the DC current of the battery should have a quadratic sinewave form shown in the following equation:

$$I_{DC}(t) = \frac{2}{V_{DC}}V_{RMS}I_{RMS}\sin^2(\omega t) = \frac{2}{V_{DC}}P_{AC}\sin^2(\omega t) = \frac{2}{V_{DC}}P_{DC}\sin^2(\omega t)$$

As a result, the DC current of the battery should have a quadratic sine form shown in the following equation:

$$I_{DC}(t) = 2I_{DC}\sin^2(\omega t)$$

Here, $$I_{DC} = \frac{1}{\pi}\int_0^\pi I_P\sin^2(\alpha)d\alpha = \frac{1}{2}I_P \text{ and}$$

$$I_{RMS} = \sqrt{\frac{1}{\pi}\int_0^\pi I_P^2\sin^4(\alpha)d\alpha} = \frac{\sqrt{3}}{2\sqrt{2}}I_P.$$

In the direct power control for a single phase system, the power transferred follows a quadratic shape of a sinusoidal wave. This is due to the nature of the sinusoidal form of the currents and voltages of the power grid. In the inverter device of the present invention, the energy accumulated in the DC link compensates the voltage of the battery, which remains practically constant compared to the other parameters.

Based on the above equations, the main equations that control the process are:

$$I_{DC}(t) = \frac{K_1}{V_{Batterry}^*(t)}V(t)_{AC}I(t)_{AC}$$

and $V_{Battery}^*(t) = V_{Battery}(t) + K_2 V_{DC\_Link}(t)$

For a split-phase configuration, this leads to:

$$I_{DC}(t) = \frac{K_1}{V_{Battery}^*(t)}[V(t)_{AC1}I(t)_{AC1} + V(t)_{AC2}I(t)_{AC2}]$$

Here, $V^*_{Battery}$ is the compensated value of the battery voltage $V_{Battery}$, K1 is a factor that depends on the efficiency of the process and the relation between of the DC battery voltage and the AC voltage, K2 is a factor that depends on the size of the capacitors of the DC link, in particular on the energy accumulated in them and the relation between the battery voltage and the DC link voltage, and $V_{AC1}$ and $V_{AC2}$ denote the voltages of phase A and phase B, respectively.

Figure 5:
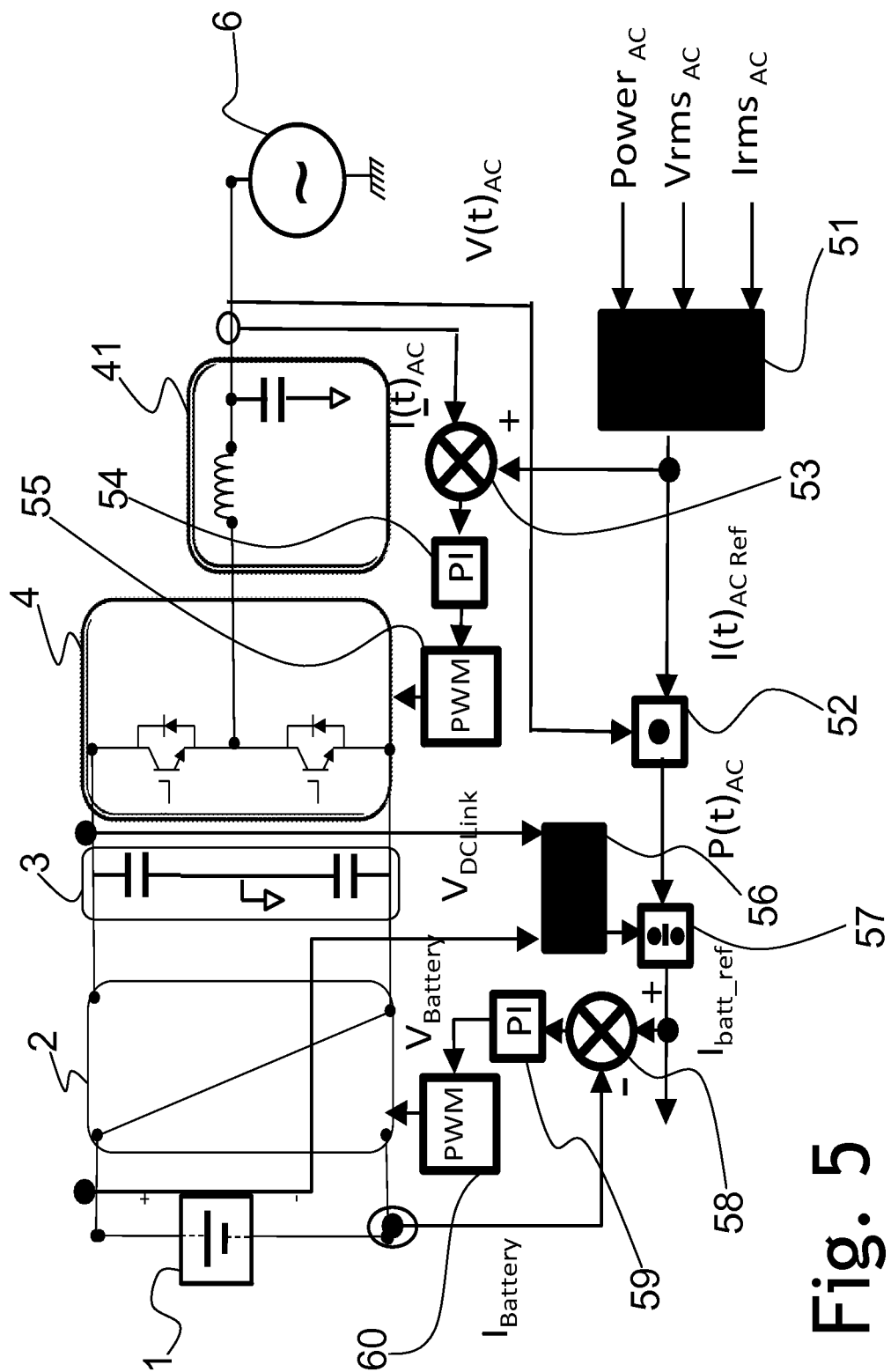
FIG. 5 is a schematic diagram showing the make-up of a control unit controlling switching elements of the inverter device in more detail.

A schematic diagram of a control unit for achieving said direct power control on the basis of the above calculation is shown in FIG. 5 in connection with the schematic diagram of the inverter device. The entire system is based on a feedback loop. The functional blocks of the inverter device described above are shown in FIG. 5 only schematically. They comprise the battery 1, the DC-DC voltage converter 2, the DC link 3, the inverter circuit 4, the low pass filter 41, which here is shown as a separate functional block as in FIGS. 4a and 4b, and the power grid 6.

The control unit is shown below in the lower half of FIG. 5 and consists of modules and operators that make up the feedback loop. Desired values for AC power Power$_{AC}$, AC voltage $V_{rms,\,AC}$ (equals to $V_{RMS}$ in the formulas above), and AC current $I_{rms,\,AC}$ (equals to $I_{RMS}$ in the formulas above) are input into an AC current reference module 51, which provides an instantaneous AC reference value $I(t)_{AC\,Ref}$ as a result. The AC reference value $I(t)_{AC\,Ref}$ is input into an inverter current controller 53 together with an instantaneous AC current value $I(t)_{AC}$ measured as the output of the low pass filter 41. The AC reference value $I(t)_{AC\,Ref}$ and the AC current value $I(t)_{AC}$ are added together in the inverter current controller 53, and the result passes through a PI controller 54, which produces a proportional and an integral part of its input. This result is then passed to a pulse-width modulator 55, which thus produces control signals for controlling the switches inside the inverter circuit 4.

At the power grid connection of the low pass filter, an instantaneous AC voltage $V(t)_{AC}$ is measured and multiplied with said AC reference value $I(t)_{AC\,Ref}$ in a multiplication operator 52 to obtain an instantaneous AC power value $P(t)_{AC}$, which is delivered to or extracted from the power grid. On the other hand, the battery voltage $V_{Battery}$ and a DC link voltage $V_{DClink}$ are measured instantaneously and provided to a zero energy accumulated DC link controller 56. Said DC link controller 56 ensures that the instantaneous DC power taken from or delivered to the battery is the same as the AC power taken from or delivered to the power grid. In order to achieve this goal, the DC link controller 56 ensures that the value of the battery voltage and the DC link voltage remain constant.

The DC link controller 56 produces a value which is divided by the instantaneous AC power value $P(t)_{AC}$ in order to obtain a battery DC current reference $I_{batt\_ref}$ which equals the instantaneous DC current to be delivered to or extracted from the battery. Furthermore, an instantaneous battery current $I_{Battery}$ is measured and subtracted from said DC current reference $I_{batt\_ref}$ in a subtraction module 58. The result is passed through another PI controller 59 and fed to another pulse-width modulator 60, which produces control signals for the switches of the DC-DC voltage converter 2.

The invention claimed is:

1. A split-phase inverter device electrically connectable between a battery and a power grid for transferring power in a bidirectional manner between said battery and said power grid, having a transformer-less configuration and comprising:

an inverter circuit comprising switching elements arranged in a multilevel clamped topology;

a control unit controlling said switching elements, wherein said control unit is configured to control said switching elements such that direct current (DC) power from said battery is transformed into alternating current (AC) power and supplied to said power grid during a discharging period, and AC power from said power grid is transformed into DC power and supplied to said battery during a charging period, and a direct current to direct current (DC-DC) bidirectional voltage converter connected to said inverter circuit and connectable to said battery, said bidirectional voltage converter comprising further switching elements controlled by said control unit, wherein the DC-DC bidirectional voltage converter is linked to the inverter circuit by a single DC link, wherein said switching elements of said inverter circuit are arranged in a modified neutral point clamped (MNPC) topology, wherein a neutral point of the single DC link is not conducted to a grid ground of the power grid, and wherein a leakage current from a parasitic capacitance of the battery to the grid ground is limited by the MNPC topology.

2. The split-phase inverter device according to claim 1, wherein said control unit comprises a pulse width modulation control unit.

3. The split-phase inverter device according to claim 1, further comprising a DC-DC unidirectional voltage converter connected to said inverter circuit and connectable to a solar panel.

4. The split-phase inverter device according to claim 3, wherein the DC-DC unidirectional voltage converter is linked to the inverter circuit by a single DC link.

5. The split-phase inverter device according to claim 3, wherein the DC link is connected between the DC-DC unidirectional voltage converter and the inverter circuit.

6. The split-phase inverter device according to claim 1, wherein said control unit and said inverter circuit are arranged in a feedback loop.

7. The split-phase inverter device according to claim 1, wherein said control unit is a direct power control control unit.

8. The split-phase inverter device according to claim 7, wherein said control unit is configured to control said switching elements such that the current extracted from said battery during said discharging period or the current supplied to said battery during said charging period has a quadratic sinusoidal form.

9. The split-phase inverter device according to claim 1, wherein said switching elements comprise solid state switches, and wherein the solid state switches include insulated-gate bipolar transistors.

10. The split-phase inverter device according to claim 9, wherein at least two switches are integrated on a single die.

11. An energy storage system comprising a battery and a split-phase inverter device according to claim 1, said split-phase inverter device being electrically connected between said battery and a power grid for transferring power in a bidirectional manner between said battery and said power grid.

12. The split-phase inverter device according to claim 1, wherein the single DC link is coupled by an inductor to the battery.

13. The split-phase inverter device according to claim 1, wherein the limitation of the leakage current improves the efficiency of the transformer-less configuration.

14. A method of controlling a split-phase inverter device having a transformer-less configuration, which is electrically connected between a battery and a power grid for transferring power in a bidirectional manner between said battery and said power grid and which comprises an inverter circuit comprising switching elements arranged in a multilevel clamped topology, and a direct current to direct current (DC-DC) bidirectional voltage converter connected to said inverter circuit and connectable to said battery, wherein the DC-DC bidirectional voltage converter is linked to the inverter circuit by a single DC link, wherein, using a control unit, said switching elements are controlled such that DC power from said battery is transformed into AC power and supplied to said power grid during a discharging period, and AC power from said power grid is transformed into DC power and supplied to said battery during a charging period, wherein said switching elements of said inverter circuit are arranged in a modified neutral point clamped (MNPC) topology, wherein a neutral point of the single DC link is not conducted to a grid ground of the power grid, and wherein a leakage current from a parasitic capacitance of the battery to the grid ground is limited by the MNPC topology.

15. The method according to claim 14, wherein said switching elements are controlled depending on one or more instantaneous values of the following electrical parameters: voltage at an input terminal of said inverter circuit, voltage at a point inside said inverter circuit, voltage at an output terminal of said inverter circuit, current at an input terminal of said inverter circuit, current at a point inside said inverter circuit, current at an output terminal of said inverter circuit.

16. The method according to claim 14, wherein a current having a quadratic sinusoidal form is delivered to said battery during said discharging period and/or a current having a quadratic sinusoidal form is extracted from said battery during said charging period.

* * * * *